(No Model.) 6 Sheets—Sheet 1.
T. WRIGLEY.
TICKET AND CARD PRINTING MACHINE.
No. 443,129. Patented Dec. 23, 1890.
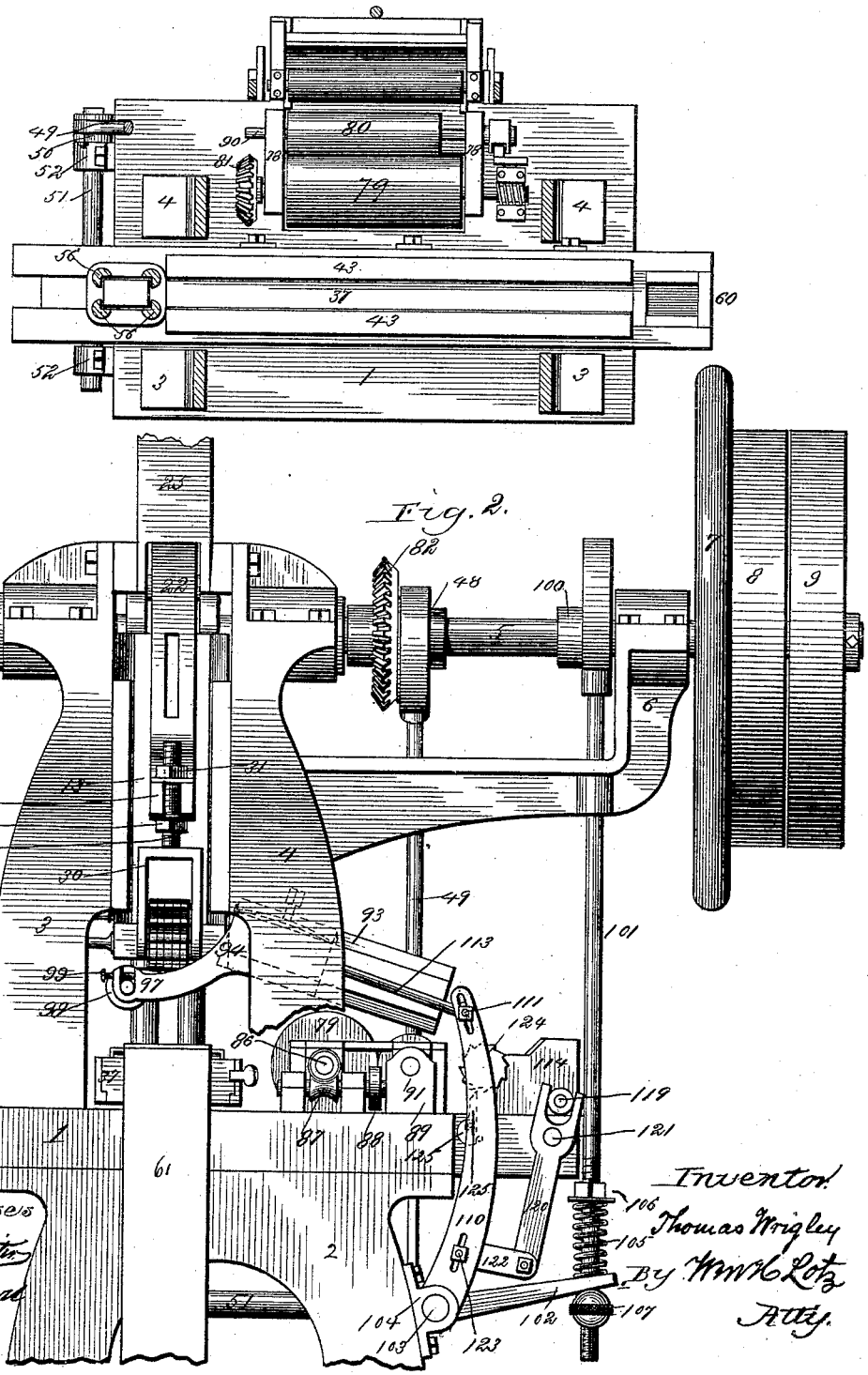

(No Model.) 6 Sheets—Sheet 2.
T. WRIGLEY.
TICKET AND CARD PRINTING MACHINE.
No. 443,129. Patented Dec. 23, 1890.
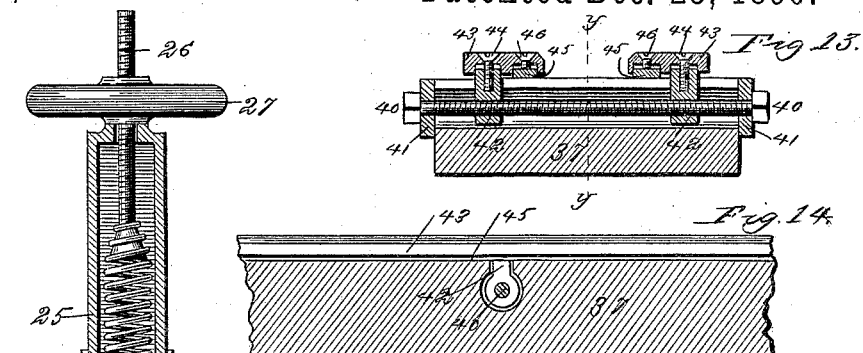
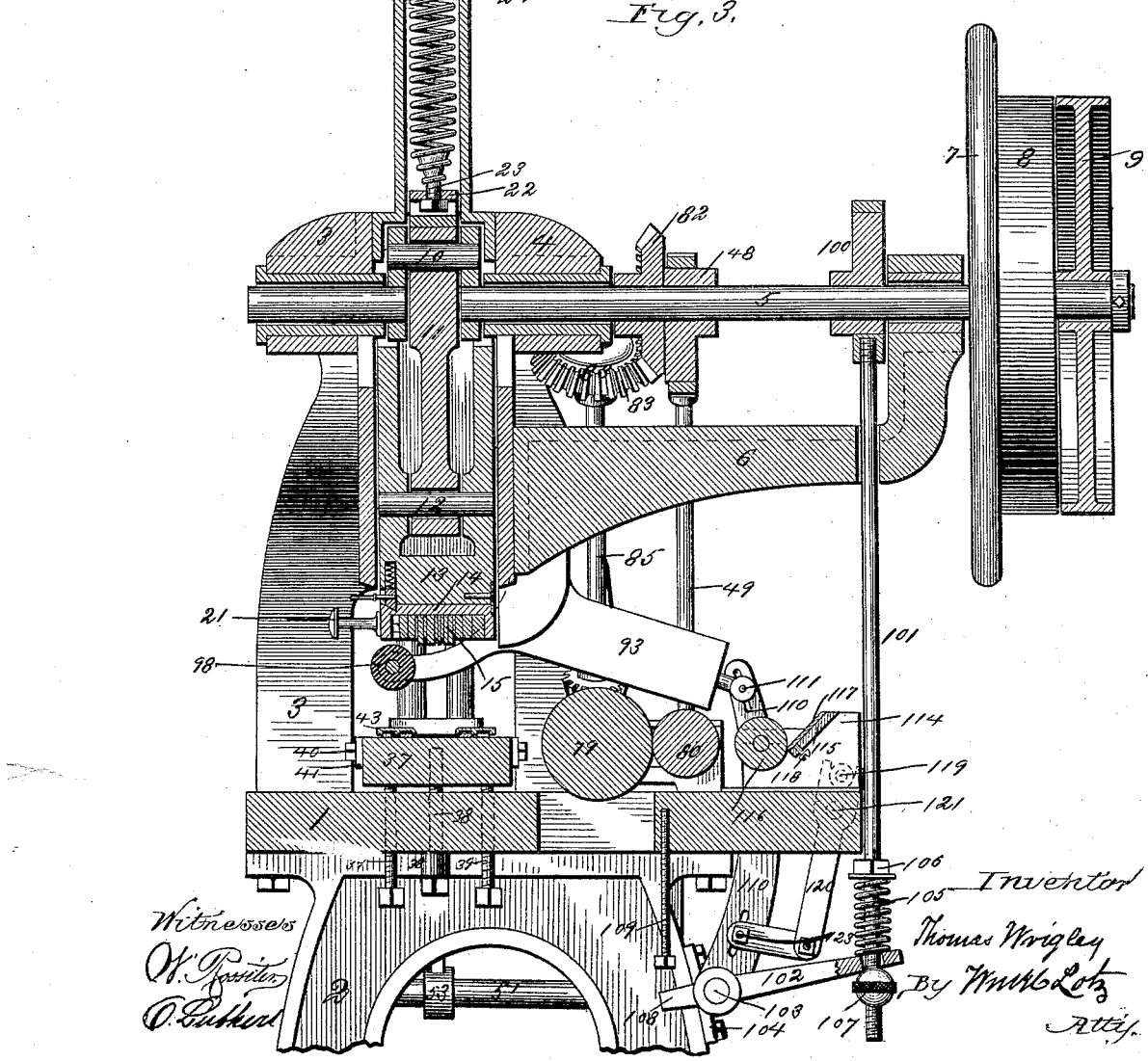

(No Model.) 6 Sheets—Sheet 3.
T. WRIGLEY.
TICKET AND CARD PRINTING MACHINE.

No. 443,129. Patented Dec. 23, 1890.

(No Model.) 6 Sheets—Sheet 4.
T. WRIGLEY.
TICKET AND CARD PRINTING MACHINE.
No. 443,129. Patented Dec. 23, 1890.
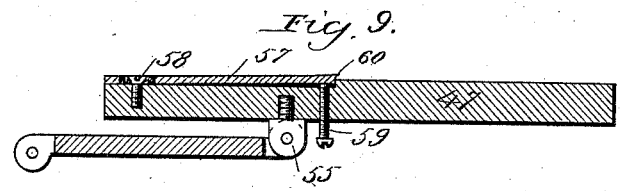
Fig. 9.
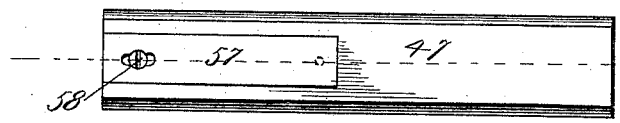
Fig. 10.
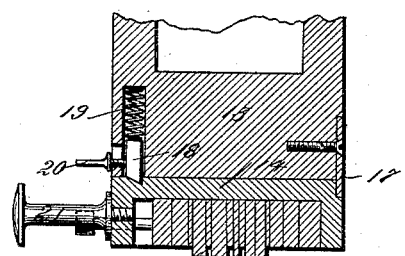
Fig. 7.
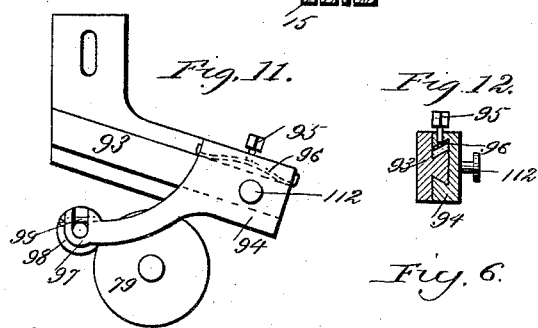
Fig. 11.
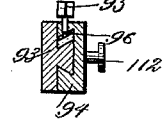
Fig. 12.
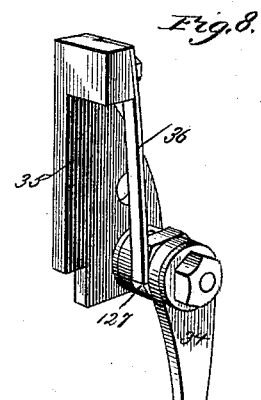
Fig. 8.
Fig. 6.
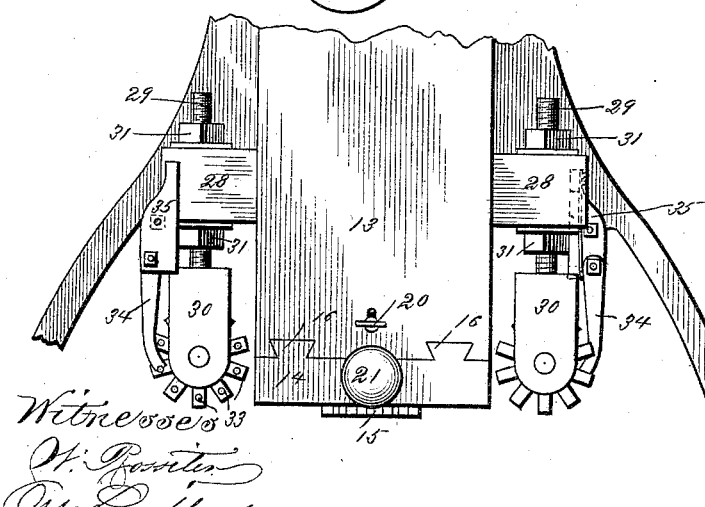
Witnesses
W. Rossiter
Otto Cuthbert
Inventor
Thomas Wrigley
By Wm H Lotz
Atty.

(No Model.) 6 Sheets—Sheet 5.

T. WRIGLEY.
TICKET AND CARD PRINTING MACHINE.

No. 443,129. Patented Dec. 23, 1890.

Witnesses
W. Rossiter
Otto Dubkert

Inventor
Thomas Wrigley
By Wm H Lotz
Atty

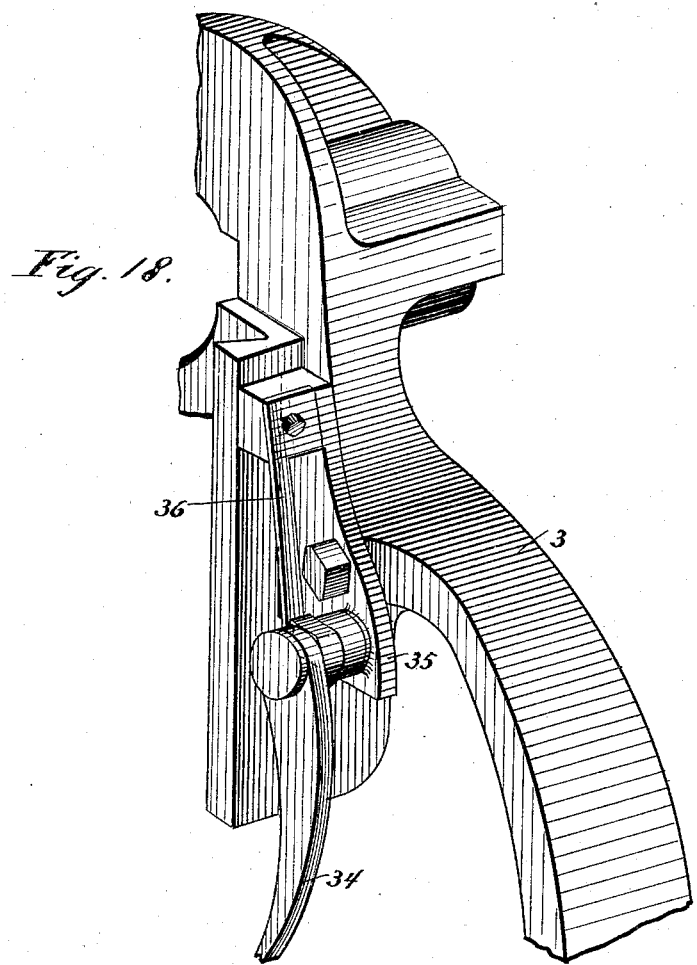

UNITED STATES PATENT OFFICE.

THOMAS WRIGLEY, OF OAK PARK, ILLINOIS.

TICKET AND CARD PRINTING MACHINE.

SPECIFICATION forming part of Letters Patent No. 443,129, dated December 23, 1890.

Application filed March 26, 1889. Serial No. 304,896. (No model.)

*To all whom it may concern:*

Be it known that I, THOMAS WRIGLEY, a citizen of the United States of America, residing at Oak Park, in the county of Cook and State of Illinois, have invented certain new and useful Improvements in Ticket and Card Printing Machines, of which the following is a specification, reference being had therein to the accompanying drawings.

This invention has for its object to provide a machine for printing tickets, cards, and labels in a more perfect and rapid manner; and with these objects in view my invention consists of the novel devices and combinations of devices hereinafter described and specifically claimed.

Figure 15:
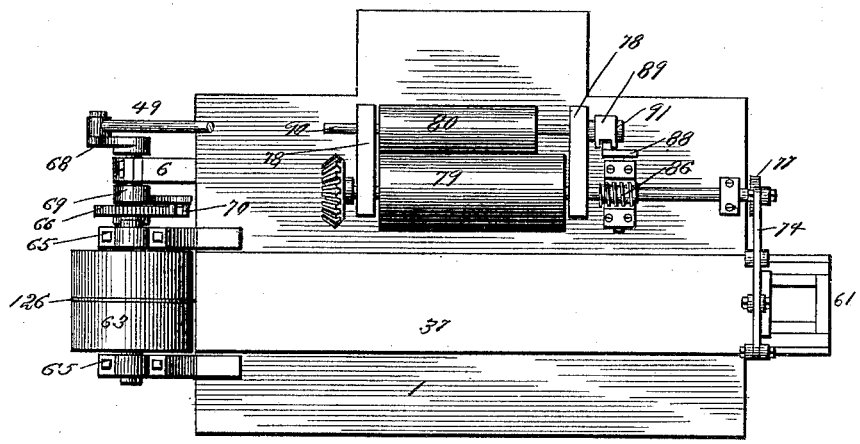

In the accompanying drawings, Figure 1 represents a sectional plan of the machine, showing the table, ticket-bed, and ink-feeding rollers. Fig. 2 is a side elevation of the machine; Fig. 3, a longitudinal vertical section through the center line of the same; Fig. 4, a transverse vertical section of the machine through the center of the chase-head. Fig. 5 is a transverse vertical section of the machine on line $x\,x$ in Fig. 3. Fig. 6 is a front elevation of the chase-head and chase, and Fig. 7 a longitudinal vertical section of the same, and Fig. 8 is the number-turning pawl detached; Fig. 9, a longitudinal vertical section of the ticket-feeder, and Fig. 10 is a plan of the same. Fig. 11 is a detached elevation of one of the type-inking-roller-carrier slides and guides for same detached, and Fig. 12 a vertical cross-section of the same. Fig. 13 represents a cross-section of the ticket-bed, and Fig. 14 a longitudinal vertical section on line $y\,y$ in Fig. 13. Fig. 15 represents a plan of the table, and Fig. 16 a transverse vertical section of the machine-frame as arranged for feeding and cutting tickets from a roll of paper, and Fig. 17 the cutter-knives for severing the tickets. Fig. 18 is a perspective view of the pawl and controlling-spring for the numbering-wheel.

Corresponding referential characters designate like parts in all the figures.

The main table 1 is secured upon legs 2, and upon this table 1 are rigidly bolted two A-shaped standards 3 and 4, both providing bearings in their upper ends for main shaft 5, which also is journaled in a bracket-bearing 6, bolted against standard 4. The shaft 5 has mounted upon its overhanging end fly-wheel 7, driving-pulley 8, and loose pulley 9. Between its bearings in standards 3 and 4 the shaft 5 has a crank 10, which by a pitman 11 connects with a pin 12 in the chase-head 13, which being box-like is vertically guided between flanges of standards 3 and 4. The chase 14 for holding the type 15 has two dovetailed ribs 16, fitting into dovetailed groves in the bottom of the chase-bed 13 for coupling such chase, the same butting against a shoulder-plate 17, fitted into the rear face of such chase-head, and being locked therein by a latch 18, guided in a socket of the chase-head 13, with a spiral spring 19 above such latch 18 for pushing the same downward, and a handle 20, secured to latch 18 and projecting through a slot in the chase-head 13 for raising the said latch 18, the beveled point of which will engage a recess in the forward end of the top of the chase. This chase 14 also has a handle 21 for withdrawing or inserting the same. By this device it will be noticed the chase 14 is rigidly held to the head 13, and yet will provide for a ready disconnection.

The chase-head 13 is closed on top by a horseshoe-shaped strap 22 that covers the crank 10 and pitman 11, and to this strap is secured, by means of a conical-headed bolt 23, one end of a spiral spring 24, inclosed within a hollow column 25, which is fixed upon the standards 3 and 4, and the upper end of this spring 24 is coupled to a conical-headed bolt 26, the shank of which, projecting through a hole in the upper extremity of such column 25, engages the screw-threaded hub of a hand-wheel 27, by which the elastic tension of spring 24 can be adjusted to carry the weight of the chase-head 13 and of pitman 11 in a manner to take up any lost motion, thereby making the movement of the machine noiseless, and the impression of the type 15 so uniform that even tingling of the tickets may be done in this machine.

To each side the chase-head 13 has two projecting lugs 28, between which are secured the screw-shanks 29 of the U-shaped frames 30 of the numbering apparatus secured by nuts 31 to be vertically and laterally adjustable thereon. The unit disk 32 of each numbering apparatus has side pins 33 that successively engage the concaved end of a pawl 34, pivoted to a bracket 35, which is secured by a screw against the inward face of either standard 3 or 4, to be rigid therewith. The hub of this pawl 34 has two flat surfaces about rectangular with each other, either one of which to provide a bearing surface for the leaf-spring 36 for holding said pawl yieldingly on its vertical position with each upstroke of the chase-head 13, to engage one of the pins 33 for advancing the unit-disk 32 one number and then with the downward stroke of such chase-head to clear the next successive pin 33, the hub of pawl 34 also being provided with a shoulder 127, against which the end of spring 36 will butt while on a vertical position, so as to allow a yielding movement only in one direction. The other flat surface on the hub of pawl 34 is to hold such pawl on a horizontal position, to which it is to be swung only for clearing the unit-wheel while setting the numbering-disk to begin with the number one again.

The ticket-feed and guide-table 37 is transversally secured upon the main table 1, between the standards 3 and 4, to be vertically below the chase 14 by holding-down screws 38, it being supported for vertical adjustment on the points of screws 39, tapped through the main table 1. This ticket-feed table is grooved transversely in several places about equal distance apart for rods 40, having cut a right-hand screw-thread upon one-half of its length and a left-hand screw-thread upon the other half of its length, and being pivoted in bars 41, secured against the side edges of table 37, with the heads of the screw-rods 40 shouldering against these side bars 41. Upon each such screw-rod 40 are fitted two nut-plugs 42, which, with turning the screw-rod in one direction or the other, will either move said nut-plugs toward or away from each other. These nut-plugs 42, extending above the table 37, thus of each side will enter sockets or a longitudinal groove planed in the under side of a bar 43, and are secured to the same by screws 44 in a manner that each bar 43 is vertically adjustable for different thickness of tickets to slide under the inward edges of these bars. Each bar 43 is also longitudinally grooved in its inward bottom face for a gib 45, adjustably held down upon table 37 by set-screws 46. These gibs will be the guides for the side edges of the tickets to be printed and are adjusted for the width of the tickets by the screw-rods 40.

Figure 17:
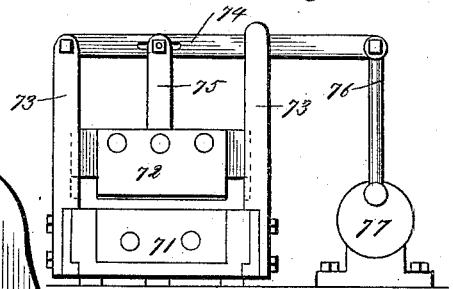
Figure 16:
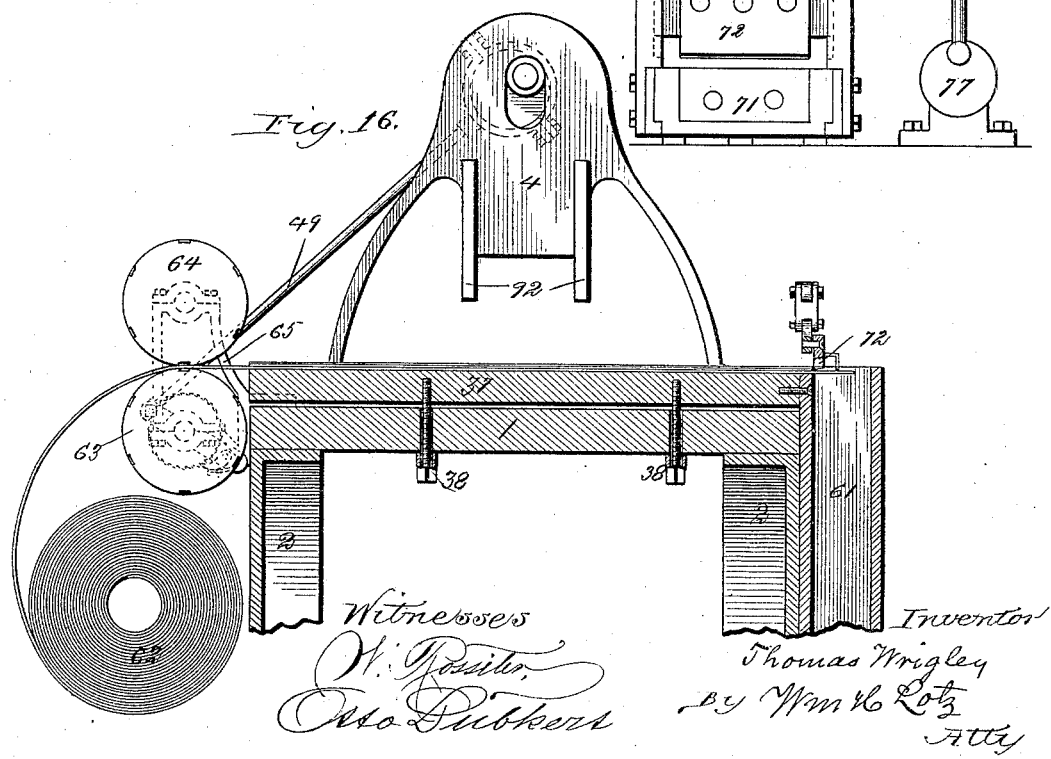

At one end the table 37 is longitudinally dovetailed and slotted for the ticket-feeding slide 47 to be guided therein, the same being reciprocated from an eccentric 48, the rod 49 of the strap of which being coupled with the slotted end of a rocker-arm 50, mounted upon rocker-shaft 51, journaled in bearings 52, secured against one of the legs 2. This rocker-shaft 51 also has mounted another rocker-arm 53, the end of which, by a connecting-link 54, is coupled to the pivot-head 55, the screw-point of which is tapped into the bottom side of slide 47. The rocker-arm 50 being slotted, its pivotal connection with the eccentric-rod 49 may be adjusted to be more or less distant from the rocker-shaft 51, so as to decrease or increase the vibrating movement of rocker-arm 53, and therewith the distance of the reciprocating movement of slide 47. On top of table 37, about centrally above the dovetailed guide for slide 47, is secured the column 56 for holding the blank tickets, which, in the usual manner, is composed of four vertical rods grooved for guiding the four corners of the blank tickets, and secured between an upper and a lower plate, the latter being cut out for the tickets to pass through. The ticket-feeding slide 47 is recessed on top of its rear portion for a plate 57, to be flush with such slide, the same being adjustably secured thereon with one end by a screw 58, passed through a slot in such plate 57 and tapped into slide 47. The opposite end of this plate 57 is adjustably raised by a set screw 59 for its edge to project more or less above the face of the slide corresponding with the thickness of the ticket, and for the purpose to prevent this edge of plate 57 from passing under the ticket it is provided with a small fin 60. This slide 47 being reciprocated under column 56, with each forward movement it will push out the lowest ticket and will move it toward the opposite end to be guided under and between bars 43 and gibs 45, when a row of tickets following one another will be pushed one by the other next following, and during the return movement of the slide 47 the ticket vertically below the chase 14 will be printed and numbered by the downstroke of the chase-head 13. One ticket after another with being pushed off table 37 will drop into a receiving-box 61, to be removed in packages ready for delivery. Instead of thus feeding ready-cut tickets, as above described, I can also attach a device for simultaneously cutting the tickets from a roll of paper or card-board, as shown by Figs. 15, 16, and 17, in which the end of a roll of paper 62 is passed between feed-rollers 63 and 64, pivoted in bracket-bearings 65, secured against one side of main table 1, the lower one of which rollers may be provided in its center with a circular knife-edge 126 for slitting the strip of paper through its middle line, thus to form and print two rows of tickets simultaneously. The shaft of the roller 63 is to have mounted upon its overhanging end a ratchet-wheel 66, another shaft in line therewith being journaled in a bracket-bearing 67, having a crank 68 to one end, coupled with eccentric-rod 49, and another crank 69 to its opposite end, which carries a pawl 70, engaging the teeth of ratchet-wheel 66. The oscillating movement imparted by the eccentric 48 to cranks 68 and 69 will thus transmit an intermittent rotary movement to rollers 63 and 64, each such movement feeding the paper the length of one ticket. The paper strip by the rollers will be pushed through under the guide-bars 43 between gibs 45 upon table 37, and after being printed and numbered the tickets will be severed by passing through between two shearing-knife plates, secured to the opposite end of table 37, just above ticket-receiving box 61. The lower knife-plate 71 being stationary, with its cutting-edge on a level with the top of table 61, and the upper knife-plate 72 being vertically guided between standards 73, to one of which is pivoted a lever 74, guided in the other bifurcated standard, and central between these standards the knife-plate 72 is pivotally connected to such lever by a bar 75. The other end of lever 74, by a pitman 76, is connected with a crank 77, mounted upon the extension of the main inking-roller shaft. The tickets as cut off will drop into the box 61.

In journal-boxes 78, secured upon table 1, are pivoted the inking-rollers 79 and 80, so as to be in frictional contact with each other. The larger roller 79 has mounted upon one of its overhanging ends a bevel-gear 81, and is driven from a bevel-gear 82, mounted upon main shaft 5, by an intermediate inclined shaft 85, having mounted bevel-pinions 83 and 84 that respectively mesh with the wheels 81 and 82, thus transmitting to this roller a continuous positive movement. Upon the opposite end of the shaft of inking-roller 79 is mounted a worm 86, engaging a worm-wheel 87, that is mounted upon a small shaft pivoted in suitable boxes to be rectangular to the shaft of roller 79, and upon the overhanging end of this worm-wheel shaft is mounted a small crank 88, the crank-pin of which engages with the vertical groove of a box 89, sliding upon table 1, and through this box 89 is projected the end of shaft 90 of roller 80, being laterally held therein by two collars 91, secured upon said shaft 90. By this device the roller 80 is laterally reciprocated while rotating from frictional contact with roller 79 for distributing the ink upon such roller 79. Against downwardly-projecting flanges 92 of standard 4 are bolted, so as to be vertically adjustable to inclined guide-bars 93, having dovetailed guide-strips, and upon each such guide-bar is fitted a plate 94, having a dovetailed flange to its bottom edge that engages the lower edge of the guide-strip of bar 93, and to its top a dovetailed flange, under which by a set-screw 95 is secured a semi-elliptic leaf-spring 96, that is shaped to bear with its ends upon the upper dovetailed edge of the guide-strip of bar 93, and the extreme ends of this spring 96 are bent rectangular to provide shoulders for holding said spring in position. Each plate 94 has a forwardly-projecting arm, which in its end is grooved to provide a bearing 97 for one of the journals of a composition roller 98, the same being removably locked in such bearings by pins 99. This composition roller thus supported is to be reciprocated from contact with inking-roller 79 to pass under the type 15 in chase 14 after each upstroke of chase-head 13, inking these type for the next ticket to be printed, whereby the spring 96, allowing a certain amount of elastic yield, will hold the roller 98 against the type with the desired tension and at the same time will accommodate said roller to follow the face of the type to insure a uniform inking of the same. Motion is transmitted to plate 94 from an eccentric 100, mounted upon shaft 5, the strap to which eccentric has a rod 101 screw-threaded on its lower end where it is passed through the slotted end of a horizonal arm 102, mounted upon the middle of a shaft 103, that is journaled in bearings 104, secured against the legs 2 of the machine-frame. Above arm 102 the rod 101 is surrounded by a spiral spring 105, bearing with its lower end upon said arm and abutting with its upper end against a nut 106, screwed upon rod 101, and below arm 102 a spherical nut 107 is screwed upon rod 101, the arm 102 having a short extension 108, which will strike against the head of a set-screw 109 for limiting the swinging motion of arm 102, when a further down movement of the eccentric-rod 101 will contract spring 105, and will thus provide a time of rest to rocker-shaft 103. Upon this shaft 103 are also mounted two vertical arms 110, slotted in their upper ends for adjustably securing thereto the pivot-pins 111, coupled with the pins 112 of plates 94 by connecting-rods 113. The movement thus imparted to composition roller 98 will be to hold the same in frictional contact with inking-roller 79 during the time the spring 105 is contracted, and released again for said roller 98 to be coated with ink, which then will be moved under the type 15 while the chase-head 13 is on its uppermost position, and will then be returned and contacted again with roller 79. The ink-fountain consists of two side plates 114, connected by an inclined plate 115 and providing journal-boxes for a roller 116. A scraper 117 is secured upon plate 115, to be adjusted toward roller 116 by set-screws 118 to bring the roller-edge of such scraper in contact with said roller 116.

The side plates 114 of the ink-fountain have side studs 119, forming the pivot-pins for rollers engaging the bifurcated upper ends of levers 120, that swing on fulcrum-pins 121 of main table 1, while the lower ends of these levers are coupled by links 122 with pins 123, adjustably secured in the slotted portion of arms 110 at near the hub thereof. Upon the overhanging end of shaft of roller 116 is mounted a small ratchet-wheel 124, the teeth of which engage with a spring-pawl 125, pivotally secured to table 1 in a position that with each reciprocating movement of the ink-fountain said pawl will engage the ratchet-wheel 124, thereby turning the roller 80 a partial revolution.

Printers' ink being put upon scraper 117, as much will adhere to roller 116 as said scraper will permit to pass, and the fountain being reciprocated with the vibration of arms 110, whereby with each forward movement its roller 116 is brought in frictional contact with roller 80, it is rotated thereby, and this rotation, together with the lateral reciprocation of roller 80, will feed ink to said roller 80, that again will feed ink uniformly distributed upon roller 79, from which with each reciprocation the composition roller 98 will get a supply sufficient for inking the type 15.

In ticket-printing machines built heretofore the crank of main shaft 5 for reciprocating the chase-head 13 was overhanging, and therefore from the hammer-like movement imparted thereby did soon wear and get loose in its bearing, all of which I have overcome by providing a journal-bearing to each side of the crank in standards 3 and 4 and the counter-balance spring 24, which combined will make the movements of the chase-head very easy and the printing very perfect and uniform. It will be readily seen every movement in this press is adjustable and can be compensated to be harmonious with the other movements.

What I claim is—

1. In a ticket-printing machine, the combination, with the numbering-wheel thereof, said wheel being provided with side pins 33, of a pawl 34 for engaging said pins, pivoted to a bracket 35, secured to either frame-standard and provided with a leaf-spring 36, the end of which will butt against a shoulder formed to the hub of pawl 34 while the latter is on its vertical position, said springs 36 also engaging either one of two flat faces of the hub of pawl 34, substantially as and for the purpose set forth.

2. In a ticket-printing machine, the ticket-feed table 37, grooved transversely for right and left threaded screw-rods 40, pivoted in side plates 41, nut-plugs 42, engaging said screw-rods, guide-bars 43, adjustably secured upon such nut-plugs, and guide-gibs 45, adjustably inserted into grooves of said guide-bars, all substantially as set forth, for the purpose specified.

3. In a ticket-printing machine, the combination, with the type-inking roller 98, slide, and rod for operating it, of the eccentric-rod 101 and the rocker-arm 102, both for reciprocating the type-inking roller 98, being pivotally and yieldingly coupled by the end of eccentric-rod 101, passed through the slotted end of arm 102, being held between a spiral spring depressed by a nut 106 and a spherical nut 107 of eccentric-rod 101, all substantially as and for the purpose set forth.

In testimony whereof I affix my signature in presence of two witnesses.

THOMAS WRIGLEY.

Witnesses:
WILLIAM H. LOTZ,
OTTO LUBKERS.